(12) United States Patent
Aby

(10) Patent No.: US 12,659,311 B2
(45) Date of Patent: Jun. 16, 2026

(54) PSEUDO-PASSWORDLESS AUTHENTICATION SYSTEM

(71) Applicant: The University of Tulsa, Tulsa, OK (US)

(72) Inventor: Rohan George Aby, Tulsa, OK (US)

(73) Assignee: THE UNIVERSITY OF TULSA, Tulsa, OK (US)

( * ) Notice: Subject to any disclaimer, the term of this patent is extended or adjusted under 35 U.S.C. 154(b) by 233 days.

(21) Appl. No.: 18/505,032

(22) Filed: Nov. 8, 2023

(65) Prior Publication Data

US 2025/0150450 A1 May 8, 2025

(51) Int. Cl.
*H04L 9/40* (2022.01)
*G06K 19/06* (2006.01)

(52) U.S. Cl.
CPC .... *H04L 63/0838* (2013.01); *G06K 19/06037* (2013.01); *H04L 63/083* (2013.01); *H04L 63/0884* (2013.01)

(58) Field of Classification Search
CPC .............. H04L 63/0838; H04L 63/083; G06K 19/06037
See application file for complete search history.

(56) References Cited

U.S. PATENT DOCUMENTS

| | | | |
|---|---|---|---|
| 11,848,754 B1* | 12/2023 | Dods | H04L 9/0894 |
| 2013/0219479 A1 | 8/2013 | DeSoto | |
| 2014/0365778 A1* | 12/2014 | Wang | G06F 21/45 |
| | | | 713/175 |
| 2015/0088674 A1* | 3/2015 | Flurscheim | G06Q 20/326 |
| | | | 705/17 |
| 2022/0240093 A1* | 7/2022 | Bora | H04B 17/318 |
| 2023/0122215 A1* | 4/2023 | Pavlou | H04L 9/3226 |
| | | | 713/168 |

* cited by examiner

*Primary Examiner* — Huan V Doan

(74) *Attorney, Agent, or Firm* — Slayden Grubert Beard PLLC

(57) ABSTRACT

A machine-readable medium includes instructions. The instructions, when read and executed by a processor, cause the processor to, at a client, receive an instruction to authenticate use of a server application through a host, obtain login credentials for the server application on the host, generate a machine-readable code to represent the login credentials, and display the machine-readable code to log in to the server application through the host.

8 Claims, 4 Drawing Sheets

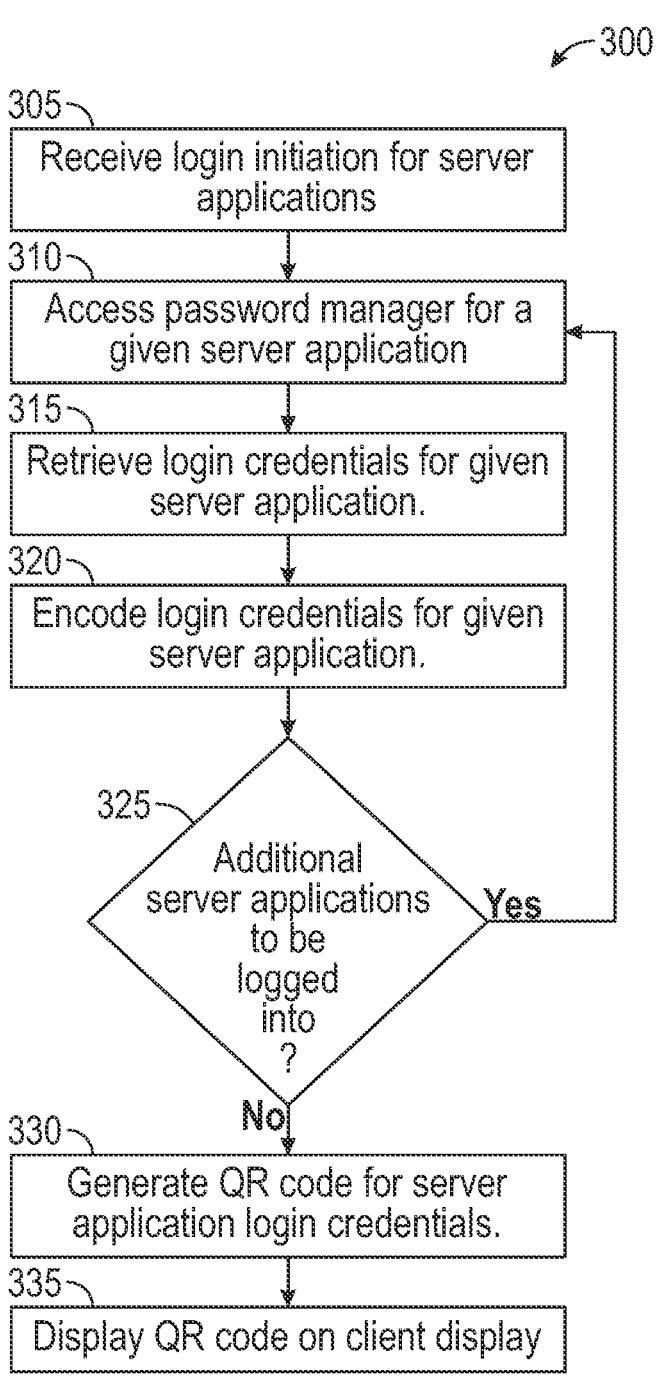

300

305 — Receive login initiation for server applications

310 — Access password manager for a given server application

315 — Retrieve login credentials for given server application.

320 — Encode login credentials for given server application.

325 — Additional server applications to be logged into ?

Yes

No

330 — Generate QR code for server application login credentials.

335 — Display QR code on client display

FIG. 3

PSEUDO-PASSWORDLESS AUTHENTICATION SYSTEM

FIELD OF THE INVENTION

The present disclosure relates to authenticating users over a computer network and, in particular, to a pseudo-passwordless authentication system.

BACKGROUND

Quick-response (QR) codes are implemented as a two-dimensional matrix barcode. Scanning a QR code automatically with a camera can read plain text embedded in the QR code therein. Systems exist wherein a host or service may display a QR code to a user, who may scan in the QR code with a mobile device as part of authentication, wherein by scanning in the QR code, the presence of the user at the host device is verified.

However, this login assistance is not useful in many scenarios.

Also, users of a publicly available machine often do not want to use a password manager on the publicly available machine. If that device is compromised, many passwords can be stolen, reflecting such a password manager a single point of failure.

Moreover, users experience difficulty when trying to log into host services at kiosks, electronic devices, or smart displays, particularly when the user is not an owner of the device. These may occur, for example, when a user logs into a guest office machine, a machine at a library, a video game machine, or a smart TV at a hotel. Such logins require a user to remember a username and a password and manually enter such information into the device. A further complication is that input/output of such devices may be limited in that no physical keyboard might be provided. A virtually displayed touchscreen keyboard may be awkward to use. Moreover, a virtually displayed non-touch keyboard, by which a user must navigate with a television remote control or video key pad, may be cumbersome given the need to enter a username and password.

Embodiments of the present disclosure may address one or more of these issues.

BRIEF DESCRIPTION OF THE DRAWINGS

FIG. 3 is an illustration of an example method for pseudo-passwordless login for a client, according to embodiments of the present disclosure.

DETAILED DESCRIPTION

Figure 1:
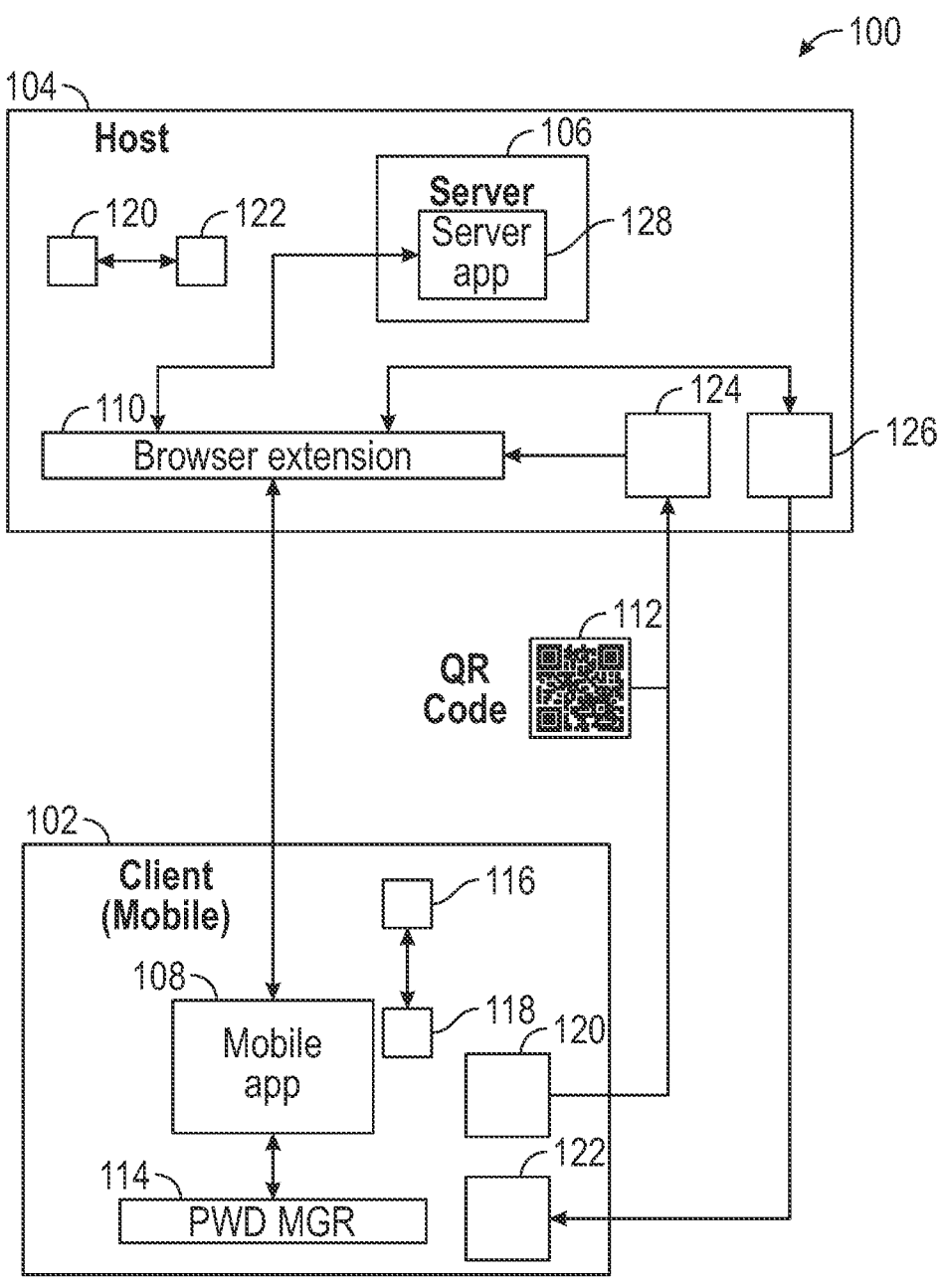
FIG. 1 is an illustration of an example system for pseudo-passwordless login, according to embodiments of the present disclosure.

FIG. 1 is an illustration of an example system 100 for pseudo-passwordless login, according to embodiments of the present disclosure.

System 100 may include any suitable number and kind of elements. System 100 may include a client 102 attempting to access a host 104. In various embodiments, client 102 may actually be attempting to access a server 106 or a server application 128 on server 106. Even though client 102 may actually be attempting to access server 106 or server application 128, client 102 may be attempting to access server 106 or server application 128 as they exist on or are communicatively coupled to host 104.

Client 102 may be implemented in any suitable manner, such as a mobile device, smartphone, laptop, or other suitable electronic device. Host 104 may be implemented in any suitable manner, such as a kiosk, laptop, computer, smart television, or other suitable electronic device. Server 106 and server application 128 may be implemented by any suitable server or application, such as e-mail, streaming service, or online account. Server 106 may provide support or execution of server application 128. Server application 128 may include any suitable application for which login credentials are to be provided in order to use server application 128. After authentication of a user, host 104 may provide access to server application 128 to users of client 102. Authentication of a user may be performed by providing correct login credentials such as a username and password, or any other suitable credentials. Although shown as within host 104, server 106 and server application 128 may be implemented within host 104 or may be communicatively connected to host 104. For example, host 104 may be a laptop or smart television with access to a streaming service, which a user of client 102 and host 104 may use host 104 to access such a streaming service, and the actual server 106 or server application 128 that provides such a streaming service is located remotely from host 104 over any suitable network connection. In some embodiments, server 106 might not be used, such as wherein server application 128 is running directly on host 104.

In order to provide login and authentication of users of client 102, host 104 may include any suitable software or circuitry. For example, host 104 may provide browser extension 110. Browser extension 110 may be implemented, for example, as an extension to a browser interface in which server application 128 is accessed on host 104 by a user of client 102. Browser extension 110 may be implemented by, for example, instructions for execution stored on a memory 120 for execution by a processor 122, analog circuitry, digital circuitry, or any suitable combination thereof. Moreover, server application 128 may be implemented by, for example, instructions for execution stored on memory 120 for execution by processor 122, analog circuitry, digital circuitry, or any suitable combination thereof.

Client 102 may include a mobile application 108. Mobile application 108 may be used by a user of client 102 to access server application 128, or at least to provide login credentials to host 104 so that client 102 may access server application 128. Moreover, mobile application 108 may be used to authenticate a user of client 102 so as to access server application 128.

Client 102 may include or may be communicatively coupled to a password manager 114. Password manager 114 may be configured to securely store credentials for a variety of services for use by client 102 to access, including server application 128. Password manager 114 may be implemented in any suitable manner, such as a standalone application, application programming interface (API), library, dynamically linked library, or software as a service. Password manager 114 may provide its own authentication of users of client 102, such as a face match, thumb match, username or password, two-factor authentication, or any other suitable authentication.

Mobile application 108 and server application 128 may be implemented by, for example, instructions for execution stored on a memory 116 for execution by a processor 118, analog circuitry, digital circuitry, or any suitable combination thereof.

Client 102 may include any suitable mechanism for displaying a code such as a QR code or a barcode. For example, client 102 may include a display screen 120. Client 102 may include any suitable mechanism for reading a code such as a QR code or barcode. For example, client 102 may include a camera 122.

Analogously, host 104 may include any suitable mechanism for displaying a code such as a QR code or a barcode. For example, host 104 may include a display screen 126. Host 104 may include any suitable mechanism for reading a code such as a QR code or barcode. For example, host 104 may include a camera 124.

A process of authenticating a user of client 102 for use of server application 128 may be initiated in any manner.

In one embodiment, a user may access host 104 to request use of server application 128. In response, browser extension 110 may display instructions for authenticating the user of client 102.

In another embodiment, host 104 may display a barcode or QR code on display 126. The barcode or QR code may be read by camera 122. The barcode or QR code may include information about possible services into which a user of client 102 may be authenticated.

In yet another embodiment, client 102 may display a QR code or barcode on display 120 which may be read by camera 124. The QR code or barcode may include a list of services for which client 102 can access credentials. Such credentials may be stored in, for example, password manager 114. The QR code or barcode might not include the actual credentials in this initialization of the authentication process. In response, host 104 may determine if instances of server application 128 exist for various credentials, and provide instructions for authenticating the user of client 102 for such instances of server application 128.

In still yet another embodiment, client 102 may include display instructions for authenticating the user of client 102 by default.

The instructions for authenticating the user of client 102 may depend upon the particular implementation of host 104, server application 128, and mobile application 108. The instructions may nonetheless include causing mobile application 108 to retrieve login credentials such as a username and password from password manager 114. This process may be initiated or implemented in any suitable manner. In one embodiment, a user may select an option of mobile application 108 to retrieve login credentials for a particular server application 128. In another embodiment, mobile application 108 may automatically retrieve login credentials for a particular server application 128 based upon reading a QR code or barcode from host 104, wherein the QR code or barcode indicates an identity of server application 128.

In one embodiment, a user may manually enter login credentials for server application 128 at client 102, rather than obtain login credentials from password manager 114.

Mobile application 108 may encode or encrypt the retrieved login credentials. Any suitable encryption scheme may be used, provided that the encoded login credentials may be decoded by browser extension 110. For example, a shared secret or a public-private keypair may be used to encode and decode the login credentials. Mobile application 108 may transform the encoded login credentials into a code 112, of the form of, for example, a QR code or barcode. Any suitable visual code may be used. Mobile application 108 may display code 112 on display 120.

Host 104 may read code 112 using camera 124 using browser extension 110.

Browser extension 110 may then interpret or transform code 112 into the encoded login credentials. Browser extension 110 may then decode the encoded login credentials to yield the login credentials as provided by password manager 114. Browser extension 110 may provide login credentials to server application 128 to log in to server application 128. Server application 128 thereafter may be available for use by the user of client 102.

Afterwards, the copies of the login credentials might not be stored by mobile application 108 or by browser extension 110.

Figure 2:
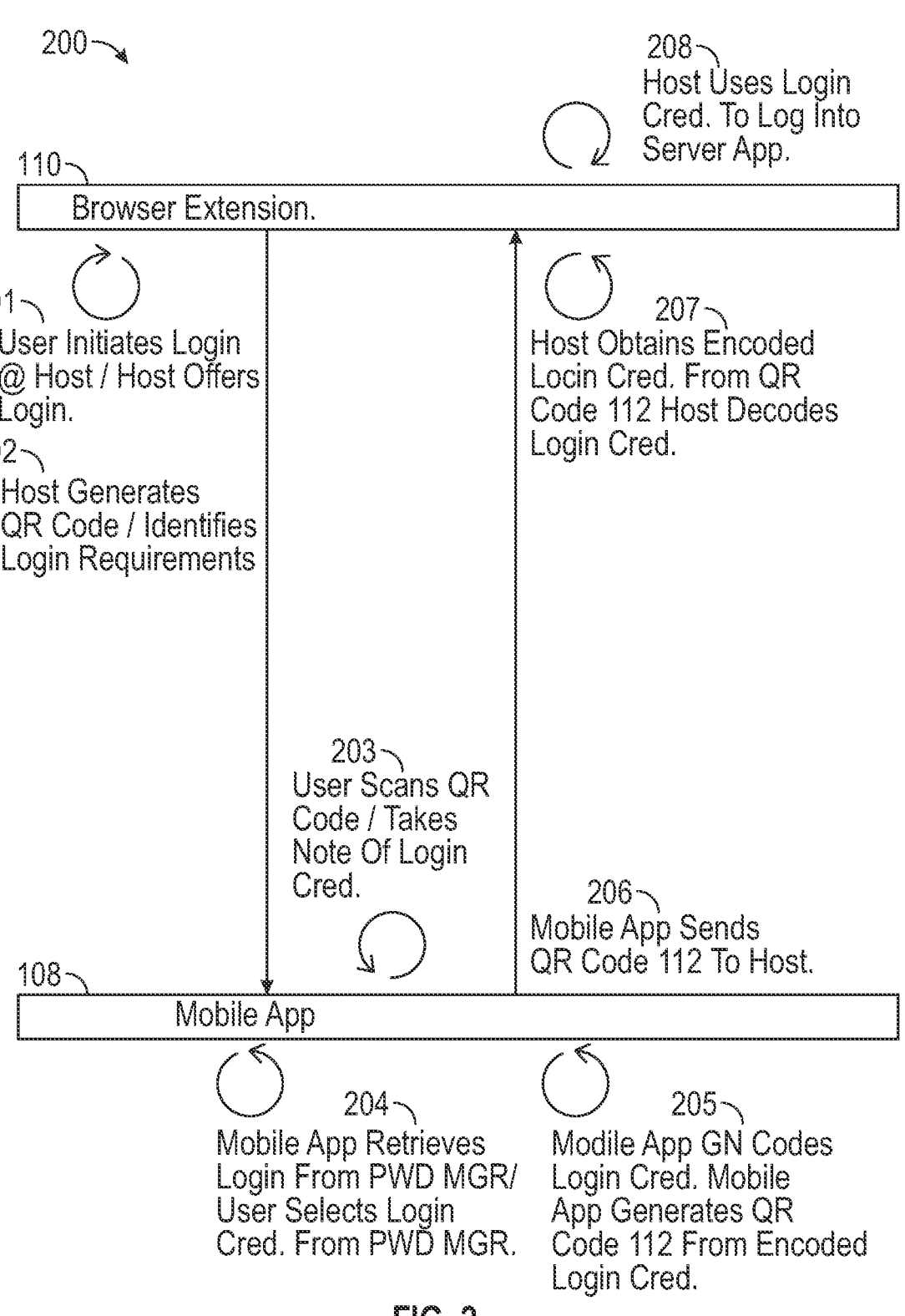
FIG. 2 is an illustration of operation of an example system for pseudo-passwordless login, according to embodiments of the present disclosure.

FIG. 2 is an illustration of operation of system 100 for pseudo-passwordless login, according to embodiments of the present disclosure.

At 1), a user may initiate a login at host 104, or host 104 may offer login, of server application 128.

At 2), host 104, through browser extension 110, may generate a code identifying possible instances of server application 128 to be used, or may otherwise identify the login requirements for server application 128.

At 3), a user of client 102 may scan the code generated at 2) using mobile application 108, or take note of the requirement for login credentials for server application 128.

At 4) mobile application 108 may retrieve login credentials for the instance of server application 128 from password manager 114, or a user of mobile application 108 may select the credentials to be retrieved from password manager 114.

At 5), mobile application 108 may encode the retrieved login credentials. Mobile application 108 may then transform the encoded login credentials into a code 112 such as a QR code.

At 6), mobile application 108 may send code 112 to browser extension 110 by, for example, displaying code 112 on a display for access by a camera used by browser extension 110.

At 7), host 104 through browser extension 110 may obtain encoded login information from code 112. Host 104, through browser extension 110, may decode the encoded login information.

At 8), host 104 through browser extension 110 may use the decoded login information to log in to server application 128.

In various embodiments, from the perspective of a user, client 102 may be considered a trusted device and host 104 (at least browser extension 110) may be considered, at least initially, an untrusted device. A trusted device may include a device that the user owns, or does not have shared access. An untrusted device may include a device that the user does not own, or that a device that is shared. Thus, a login of an untrusted device may be made by a trusted device using the operations of the present disclosure. Furthermore, the user of client 102 may be logged into server 106 and server applications 128 therein without entering a password into server application 128, but instead by causing a QR code 112 to be generated.

FIG. 3 is an illustration of an example method 300 for a client implementing pseudo-passwordless login, according to embodiments of the present disclosure. Method 300 may be implemented in by suitable mechanism, such by the elements of system 100 in FIGS. 1-2. In particular, method 300 may be implemented by mobile application 108. Method 300 may include more or fewer steps than shown in FIG. 3. Moreover, the steps of method 300 may be performed in a different order, repeated, omitted, performed in parallel with one another, or performed in parallel with other methods, such as method 400 discussed within the context of FIG. 4, discussed below.

At 305, a login initiation for one or more server applications may be received. The initiation may be made by a user of client 102 or a communication by, for example, host 104 through a QR or bar code that is scanned by client 102.

At 310, a password manager such as password manager 114 may be accessed to obtain credentials for a given server application such as server application 128.

At 315, for a given server application, login credentials for the given server application may be retrieved.

At 320, login credentials for the given server application may be encoded. In some embodiments, encoding may be delayed until all login credentials are obtained.

At 325, it may be determined whether additional server application login credentials are to be obtained. If so, method 300 may return to 310. Otherwise, method 300 may proceed to 330.

At 330, a code such as a QR code for the encoded credentials may be generated.

At 335, the code may be transmitted to a host, such as host 104, by way of displaying the code on a display device of the client. The login credentials may be deleted or otherwise not retained.

Figure 4:
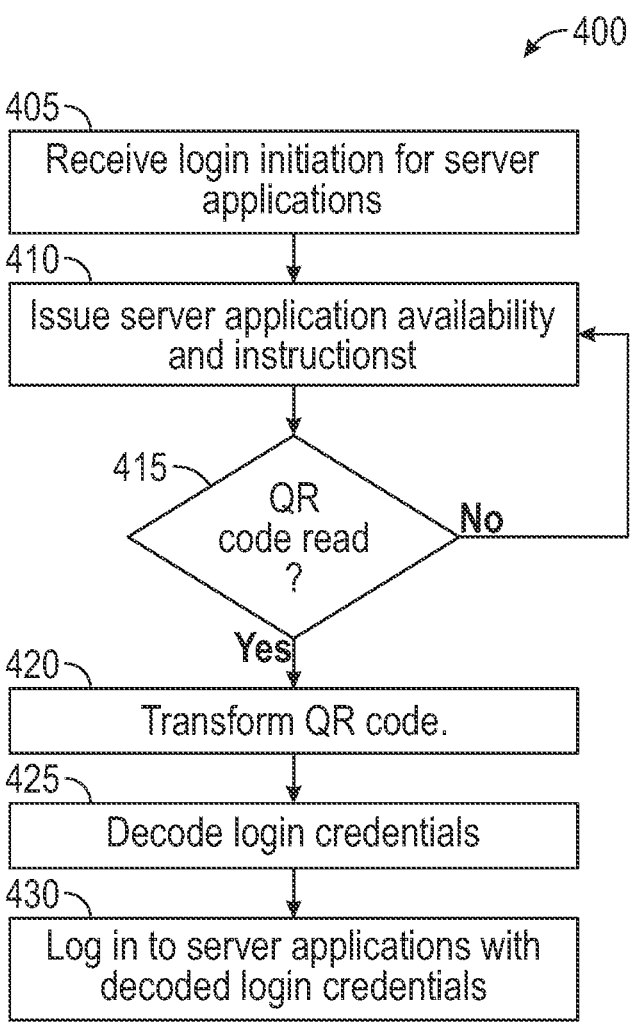
FIG. 4 is an illustration of an example method for pseudo-passwordless login for a host, according to embodiments of the present disclosure.

FIG. 4 is an illustration of an example method 400 for a client implementing pseudo-passwordless login, according to embodiments of the present disclosure. Method 400 may be implemented in by suitable mechanism, such by the elements of system 100 in FIGS. 1-2. In particular, method 300 may be implemented by browser extension 110. Method 400 may include more or fewer steps than shown in FIG. 4. Moreover, the steps of method 400 may be performed in a different order, repeated, omitted, performed in parallel with one another, or performed in parallel with other methods, such as method 300 discussed within the context of FIG. 3, discussed above.

At 405, a login initiation for one or more server applications may be received. The initiation may be made by a user of client 102 or a communication by, for example, client 102 through mobile application 108 with a QR or bar code that is scanned by browser extension 110.

At 410, server application availability and instructions may be issued. The instructions may include a QR or bar code that identifies the instances of server applications for which a user may be authenticated. The QR or bar code may be read by a client such as client 102.

At 415, it may be determined whether a QR or bar code has been read, such as code 112, by a display device of host 104. If a code has been read, method 400 may proceed to 420. Otherwise, method 400 may repeat at 410 or 415. If a period of time has expired without a code being read, method 400 may repeat at, for example, 405. Such a period of time may be, for example, five minutes.

At 420, the received QR code may be transformed to determine its contents. The contents may be encoded login credentials.

At 425, the login credentials may be decoded.

At 430, login credentials may be used to authenticate a user with the relevant server applications. The login credentials may be deleted or otherwise not retained.

Embodiments of the present disclosure may include a machine-readable medium. The medium may include instructions. The instructions, when read and executed by a processor, cause the processor to, at a client, receive an instruction to authenticate use of a server application through a host, obtain login credentials for the server application on the host, generate a machine-readable code to represent the login credentials, and display the machine-readable code to log in to the server application through the host.

In combination with any of the above embodiments, the machine-readable code may be a QR code.

In combination with any of the above embodiments, the machine-readable code may be a barcode.

In combination with any of the above embodiments, the medium may include instructions to cause the processor to encode the login credentials, wherein generating the machine-readable code to represent the login credentials includes generating the machine-readable code to represent the login credentials as encoded.

In combination with any of the above embodiments, the medium may include instructions to cause the processor to fetch the login credentials from a password manager.

In combination with any of the above embodiments, the medium may include instructions to cause the processor to delete the login credentials after generating the machine-readable code and not store the login credentials.

Embodiments of the present disclosure may include a machine-readable medium. The medium may include instructions. The instructions, when read and executed by a processor, cause the processor to, at a host, connect to a server application, the server application to be used based upon an access authentication, receive a request to access the server application, read a machine-readable code representing login credentials to authenticate access to the server application, transform the machine-readable code to the login credentials to authenticate access to the server application, and use the login credentials to authenticate access to the server application.

In combination with any of the above embodiments, the machine-readable code may be a QR code.

In combination with any of the above embodiments, the machine-readable code may be a barcode.

In combination with any of the above embodiments, the medium may include instructions to cause the processor to transform the machine-readable code to the login credentials by transforming the machine-readable code into encoded login credentials and then decoding the encoded login credential to yield the login credentials.

In combination with any of the above embodiments, the medium may include instructions to cause the processor to delete the login credentials after using the login credentials to authenticate access to the server application and to not store the login credentials.

Those in the art will understand that a number of variations may be made in the disclosed examples, all without departing from the spirit and scope of the invention, which is defined solely by the appended claims. The components of the system described above may be implemented in digital circuitry, analog circuitry, instructions for execution by a processor, or any suitable combination thereof.

What is claimed is:

1. A non-transitory machine-readable medium comprising instructions of a browser extension, the instructions, when read and executed by a processor of a host, cause the processor to:

connect, by the browser extension, to a server application, the server application to be used based upon an access authentication;

receive, by the browser extension, a request to access the server application;

read, by the browser extension, a machine-readable code representing login credentials to authenticate access to the server application;

transform, by the browser extension, the machine-readable code to the login credentials to authenticate access to the server application; and use, by the browser extension, the login credentials to authenticate access to the server application.

2. The machine-readable medium of claim 1, wherein the machine-readable code is a quick response (QR) code.

3. The machine-readable medium of claim 1, wherein, to transform the machine-readable code to the login credentials, the instructions further cause the processor to transform the machine-readable code into encoded login credentials and then decode the encoded login credential to yield the login credentials.

4. The machine-readable medium of claim 1, further comprising instructions to delete the login credentials after using the login credentials to authenticate access to the server application.

5. A method of operating a host, comprising:

connecting, by a browser extension, to a server application, the server application to be used based upon an access authentication;

receiving, by the browser extension, a request to access the server application;

reading, by the browser extension, a machine-readable code representing login credentials to authenticate access to the server application;

transforming, by the browser extension, the machine-readable code to the login credentials to authenticate access to the server application; and using, by the browser extension, the login credentials to authenticate access to the server application.

6. The method of claim 5, wherein the machine-readable code is a quick response (QR) code.

7. The method of claim 5, wherein the transforming, by the browser extension, the machine-readable code to the login credentials includes transforming the machine-readable code into encoded login credentials and then decoding the encoded login credential to yield the login credentials.

8. The method of claim 5, further comprising deleting, by the browser extension, the login credentials after the using, by the browser extension, the login credentials to authenticate access to the server application.

* * * * *